United States Patent [19]

Ngo

[11] Patent Number: 5,791,875
[45] Date of Patent: Aug. 11, 1998

[54] TIP VORTEX REDUCTION SYSTEM

[75] Inventor: Hieu Thien Ngo, Gilbert, Ariz.

[73] Assignee: McDonnell Douglas Helicopter Co., Mesa, Ariz.

[21] Appl. No.: 710,129

[22] Filed: Sep. 10, 1996

[51] Int. Cl.$^6$ .................................................. F04D 29/38
[52] U.S. Cl. ........................................... 416/90 A; 244/199
[58] Field of Search ............................... 416/90 R, 90 A; 244/199, 207

[56] References Cited

U.S. PATENT DOCUMENTS

| | | |
|---|---|---|
| 2,071,012 | 2/1937 | Adams . |
| 2,397,132 | 3/1946 | Dent, Jr. . |
| 2,689,541 | 9/1954 | Williams ........................ 416/90 A |
| 2,892,502 | 6/1959 | Donovan . |
| 3,451,644 | 6/1969 | Marchetti et al. . |
| 3,509,971 | 5/1970 | Gerstine et al. . |
| 3,915,106 | 10/1975 | DeWitt ........................... 416/90 A |
| 3,954,229 | 5/1976 | Wilson . |
| 3,964,838 | 6/1976 | Spargo ........................... 416/90 A |
| 4,040,578 | 8/1977 | Yuan ............................. 416/90 A |
| 4,168,348 | 9/1979 | Bhangu et al. ................... 416/90 R |
| 4,514,143 | 4/1985 | Campbell . |
| 4,580,210 | 4/1986 | Nordstrom . |
| 4,706,902 | 11/1987 | Destuynder et al. . |
| 4,966,526 | 10/1990 | Amelio et al. ..................... 46/90 A |
| 5,320,491 | 6/1994 | Coleman et al. . |
| 5,562,414 | 10/1996 | Azuma ........................... 416/90 A |

FOREIGN PATENT DOCUMENTS

| | | | |
|---|---|---|---|
| 1801351 | 6/1969 | Germany ........................ 416/90 A |
| 3129232 | 2/1983 | Germany ........................ 416/90 A |

*Primary Examiner*—John Kwon
*Attorney, Agent, or Firm*—Donald E. Stout; Kenton R. Mullins

[57] ABSTRACT

An active control device is disclosed for modifying a tip vortex on a lifting body. The lifting body includes a positive-pressure generating structure and a negative-pressure generating structure, and is adapted for providing lift when a first fluid pressure adjacent to the positive-pressure generating structure is greater than a second fluid pressure adjacent to the negative-pressure generating structure. The active control device includes a fluid source adapted for providing a positive pressure of fluid, such as air, to an interior of the lifting body. The active control device further includes a fluid router, which is disposed on the lifting body and which is adapted for directing a portion of the positive pressure of fluid out of the interior of the lifting body and in a general direction from the fluid router toward the positive-pressure generating structure of the lifting body. The lifting body may be either a rotorcraft blade, an aircraft foil, or a marine foil such as a marine propeller.

25 Claims, 2 Drawing Sheets

TIP VORTEX REDUCTION SYSTEM

CROSS REFERENCE TO RELATED APPLICATION

This application is related to U.S. application Ser. No. 08/251,329, entitled *Blade Vortex Interaction Noise Reduction Techniques for a Rotorcraft*, presently allowed, which issued into U.S. Pat. No. 5,588,800 on Dec. 31, 1996, which is commonly assigned with the present application.

BACKGROUND OF THE INVENTION

This invention relates to flight surfaces for rotorcraft, aircraft, and the like, and more particularly to an improved construction and control scheme for such flight surfaces which permits a significant reduction in tip vortexes generated by the flight surfaces.

When a body develops lift, the average pressure over the bottom surface is greater than the average pressure over the top surface. Consequently, there is some tendency for the air to "leak", or flow, around the edge of the body from the high-pressure side to the low-pressure side. In the case of a lifting body with forward motion, this flow creates a circulatory motion which then trails downstream of the body. The trailing circular motion of air from the edge of the body is called a tip vortex.

Conventional helicopters in descent flight conditions frequently generate this impulsive noise signature, which is commonly referred to as blade-vortex interactions (BVI) noise or "blade slap". BVI noise is generated by the blade tip vortices, which interact with the rotor blades. Unfortunately, it is typically within a frequency range which is highly important to human subjective response. As the rotor blade rotates, vortices are continuously shed from the tip of each blade. Under many operating conditions, such as hover and rotor descent, the tip vortex paths intersect the trailing blade, generating a large-amplitude pressure pulse on the blade that results in high blade vibrations and impulsive noise. Many active and passive blade tip modifications have been tried, such as Ogee tip and Active Flaps. Additionally, BVI noise is easily detected electronically at large distances, thus increasing the vulnerability of military rotorcraft.

The effect of wing tip vortices on trailing aircraft has been an aviation safety problem for major airports. When a small plane passes through the trailing vortex of a larger aircraft leading closely ahead, there is a rapid rolling moment on the plane due to the circulatory motion of air in the vortex. If this happens during landing or takeoff, the pilot has no time to gain control of the aircraft due to low altitude, and crashes immediately. Prior art approaches for solving this problem have included the installation of winglets on the wing tips of the larger aircraft to break up the vortex.

Tip vortex cavitation on air and marine propellers are other examples of the adverse phenomena attributed to tip vortices. Cavitation appears on each propeller blade and in the cores of the tip vortices where the pressure is low. A hydrofoil blade cross-section has been proposed by the prior art for attenuating this condition.

A reduction in the BVI noise intensity and changes in the noise signature, using active and/or passive noise control techniques, is desirable to the rotorcraft industry, which is challenged by today's stringent military and civilian acoustic regulations. There are several possible measures which may be taken to reduce BVI noise. Namely, the tip vortex strength may be weakened, and/or the separation distance between the blade and the tip vortex may be increased. The result of both measures is a decrease in the strength of the interaction between the rotor blade and the tip vortices. Existing devices which have been used for reducing BVI noise include Higher Harmonic blade pitch control (HHC), which seeks to change the blade tip vortex strength, and thus the local aerodynamic conditions, through blade pitch changes. Other control means concentrate primarily on reducing the strength of the tip vortex through blade tip geometric modifications. Typical examples are the use of leading and trailing edge sweep, the use of blade anhedral, spoilers, and the use of a subwing concept. All of these examples, excluding HHC, may be classified as passive control techniques. An example of another active control technique would be the use of tip air mass injection, which again has the purpose of weakening the blade tip vortices. Tip air mass injection involves introducing a high energy air jet at the tip of the blade, aimed at the center or core of the tip vortex with the sole purpose of diffusing or weakening its strength.

Each of the prior art solutions to BVI noise has been at least partially unsuccessful, either because of ineffectiveness or because of the solution's detrimental side effects with respect to the flight characteristics and efficiency of the rotorcraft. For example, HHC methods change the aerodynamic conditions along the entire blade in order to reduce BVI noise, due to the change in blade pitch. Passive BVI noise control methods are not adaptable to changing BVI conditions throughout the flight regime, which are associated with changes in descent rate and forward flight speed. Additionally, most of the prior art solutions to the BVI problem are deployed at all times, whether or not needed, often degrading flight performance unnecessarily.

SUMMARY OF THE INVENTION

This invention solves the aforementioned problems by providing a tip vortex reduction system which has a number of advantages over prior art solutions. The invention, a set of pressurized slots at the tip of a wing or helicopter rotor blade, is designed to be used as an active control device which alleviates the aerodynamics of the interactions and thus the impulsive BVI noise levels and signature. In addition to noise reduction, the tip vortex reduction system can reduce drag on wings and helicopter rotor blades from tip vortices. A set of pressurized slots is disposed at the tip of a wing or helicopter rotor blade for cancelling or greatly reducing vortices which form at the tip of the lifting airfoil surface.

More specifically, the present invention provides an active control device for modifying a tip vortex on a lifting body. The lifting body includes a positive-pressure generating structure and a negative-pressure generating structure, and is adapted for providing lift when a first fluid pressure adjacent to the positive-pressure generating structure is greater than a second fluid pressure adjacent to the negative-pressure generating structure.

The active control device includes a fluid source adapted for providing a positive pressure of fluid, such as air, to an interior of the lifting body. The active control device further includes a fluid router, which is disposed on the lifting body and which is adapted for directing a portion of the positive pressure of fluid out of the interior of the lifting body and in a general direction from the fluid router toward the positive-pressure generating structure of the lifting body. The lifting body may be either a rotorcraft blade, an aircraft foil, or a marine foil such as a marine propeller.

The active control device of the present invention further includes an intermediate structure located between the positive-pressure generating structure and the negative-pressure generating structure. The fluid router is adapted for directing a portion of the positive pressure of fluid out of the interior of the lifting body and in a general direction from the intermediate structure toward the positive-pressure generating structure of the lifting body. The directing of fluid in the general direction from the intermediate structure toward the positive-pressure generating structure of the lifting body attenuates a flow or "leak" of fluid from the positive-pressure generating structure over the intermediate structure and toward the negative-pressure generating structure.

According to another aspect of the present invention, a lifting body for providing lift to a craft includes a positive-pressure generating structure and a negative-pressure generating structure. The lifting body further includes an interior volume between the positive-pressure generating structure and the negative-pressure generating structure. The interior volume is adapted for holding a fluid, such as air. The lifting body further includes at least one aperture connecting an external structure of the lifting body to the interior volume.

A fluid router is adapted for routing fluid from the interior volume of the lifting body to the external structure. The fluid is routed by the fluid router in a general direction from the negative-pressure generating structure to the positive-pressure generating structure of the lifting body. The positive-pressure generating structure and the negative-pressure generating structure meet near a leading edge of the lifting body and near a trailing edge of the lifting body, and the aperture includes a primary slot extending generally from the leading edge of the lifting body to the trailing edge of the lifting body. The positive-pressure generating structure includes an outboard edge and an inboard edge, and the primary slot is disposed near the positive-pressure generating structure approximately along the outboard edge. The primary slot provides a fluid flow from the primary slot in a direction toward the inboard edge.

The lifting body further includes an intermediate structure disposed between the positive-pressure generating structure and the negative-pressure generating structure, and a secondary slot disposed on the intermediate structure. The secondary slot is adapted for providing a fluid flow from the secondary slot in a direction toward the primary slot. The secondary slot extends on the intermediate structure generally from the leading edge of the lifting body to an intermediate area on the lifting body located between the leading edge and the trailing edge of the lifting body. The primary slot is defined by a primary Coanda surface and a primary slot lip plate, and the secondary slot is defined by a secondary Coanda surface and a secondary slot lip plate.

According to another aspect of the present invention, a lifting body for providing lift to a craft includes a positive-pressure generating structure, a negative-pressure generating structure, and an outboard edge disposed between the positive-pressure generating structure and the negative-pressure generating structure. The lifting body further includes a fluid router disposed on the lifting body near the outboard edge. The fluid router is adapted for routing fluid in a general direction from the negative-pressure generating structure to the positive-pressure generating structure.

According to yet another aspect of the present invention, a fluid routing system for routing fluid over an external surface of a lifting body includes a determiner adapted for determining whether a positive pressure is present on a positive-pressure generating surface, and a fluid router adapted for routing fluid in a general direction from a negative-pressure generating surface to the positive-pressure generating surface. The fluid router routes the fluid when the determiner determines that a positive pressure is present on the positive-pressure generating surface. The fluid routing system routes fluid in the general direction from the negative-pressure generating surface to the positive-pressure generating surface, to thereby attenuate a leakage of fluid from the positive-pressure generating surface to the negative-pressure generating surface. The fluid routing system further includes a fluid pressure source adapted for supplying pressurized fluid to the fluid router and an activator adapted for activating the fluid pressure source when the determiner determines that a positive pressure is present on the positive-pressure generating surface of the lifting body.

The method of the present invention includes a first step of determining whether a positive pressure is present on the positive-pressure generating surface of the lifting body, and a second step of routing fluid in a general direction from the negative-pressure generating surface to the positive-pressure generating surface. The second step is taken when a determination is made that a positive pressure is present on the positive-pressure generating surface of the lifting body.

The present invention, together with additional features and advantages thereof, may best be understood by reference to the following description taken in connection with the accompanying illustrative drawings.

DETAILED DESCRIPTION OF THE PRESENTLY PREFERRED EMBODIMENT

Figure 1:
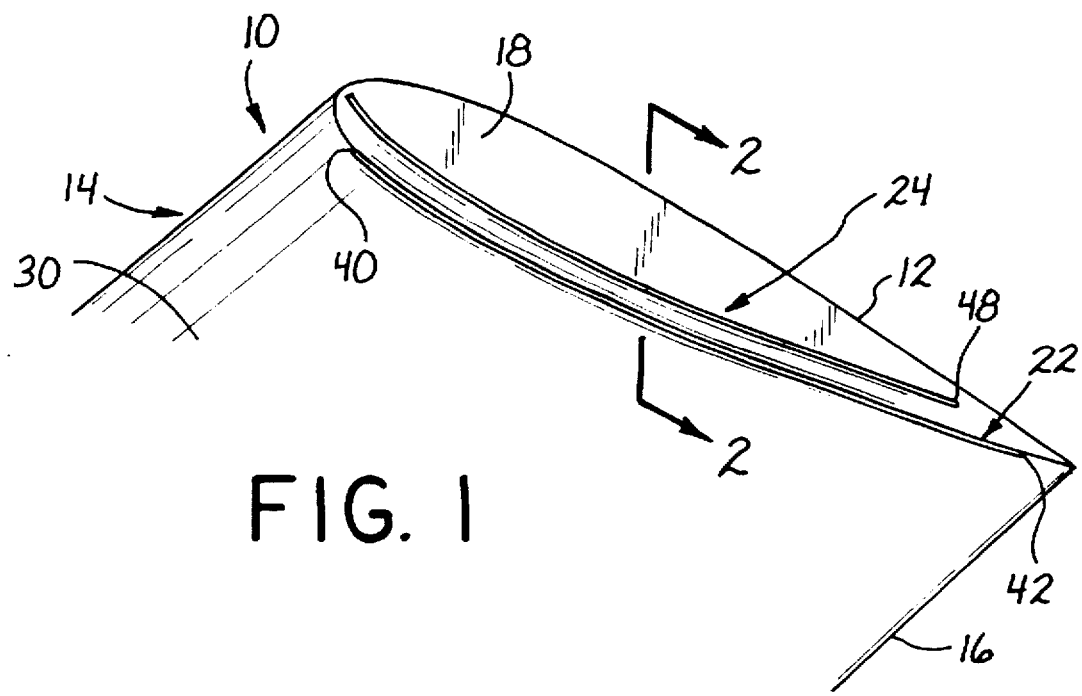
FIG. 1 is a perspective view of the tip vortex reduction system according to a first embodiment of the present invention.

Referring now more particularly to FIG. 1, a tip vortex reduction system 10 is illustrated, installed on a wing 12 of an aircraft. The wing 12 comprises a leading edge 14, a trailing edge 16, an outboard edge 18, and an inboard edge (not shown).

The tip vortex reduction system 10 of the present invention comprises at least one circulation-control slot 22. As presently embodied, the tip vortex reduction system 10 of the present invention, as applied to the wing of an aircraft, comprises a primary circulation-control slot 22 and a secondary circulation-control slot 24. Both the primary circulation-control slot 22 and the secondary circulation-control slot 24 are preferably disposed near the outboard edge 18 of the wing 12. As presently embodied, the primary circulation-control slot 22 is disposed along the outboard edge 18 and on the high-pressure side 30 of the wing 12. The primary circulation-control slot 22 extends from a first location 40 just short of the leading edge 14 to a second location 42 just short of the trailing edge 16. The secondary circulation-control slot 24 is disposed on the outboard edge 18, and extends generally from the leading edge 14 to a location 48, which is not as close to the trailing edge 16 as the location 42.

Figure 2:
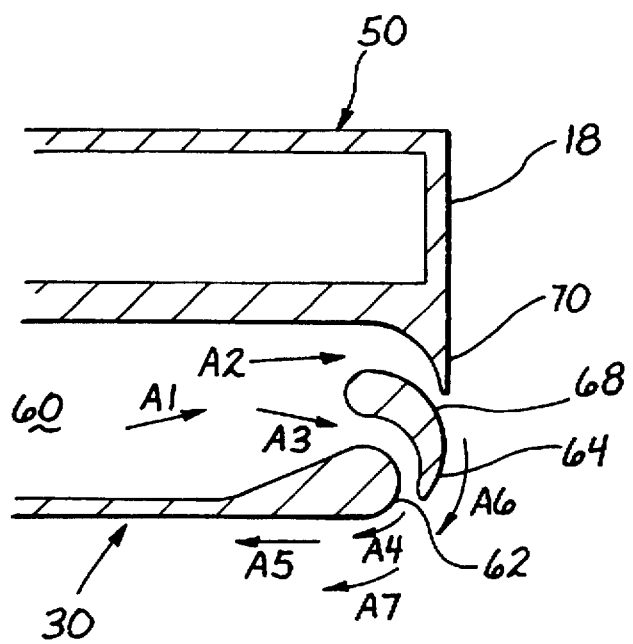
FIG. 2 is a cross-sectional view of the tip vortex reduction system of FIG. 1 taken along line 2—2.

A cross-sectional view of the tip vortex reduction system 10 of FIG. 1, taken along the line 2—2, is illustrated in FIG. 2. A low-pressure side 50 of the wing 12 is located opposite the high-pressure side 30 of the wing 12. As the leading edge 14 of the wing 12 travels, and the high-pressure side 30 develops a pressure greater than the low-pressure side 50, the wing 12 develops lift. Air on the high-pressure side 30 has a tendency to "leak" or flow across or around the outboard edge 18 from the high-pressure side 30 to the low-pressure side 50. Since the leading edge 14 travels with forward movement of the aircraft and the trailing edge 16 trails the leading edge 14, a flow of air from the high-pressure side 30 to the low-pressure side 50 creates a circulatory motion which then trails downstream of the wing 12. This trailing circular motion of air from the outboard edge 18 of the wing 12 is referred to as a tip vortex.

An air duct 60 of the present invention supplies air to both the primary circulation-control slot 22 and the secondary circulation-control slot 24 in the direction of the arrows A1, A2, and A3. As presently embodied, the primary circulation-control slot 22 comprises a primary Coanda surface 62 and a primary slot lip plate 64 for providing blowing of air from the air duct 60 in the direction of the arrows A4 and A5. This in-board blowing is used to balance the outward flow of air from the high-pressure side 30 across the outboard edge 18 to the low-pressure side 50. The secondary circulation-control slot 24 similarly comprises a secondary Coanda surface 68 and a secondary slot lip plate 70 for providing blowing of air from the air duct 60 in the direction of the arrows A6 and A7, when combined with flow from the primary circulation-control slot 22. The blowing of air from the primary circulation-control slot 22 and the secondary circulation-control slot 24 in the direction of the arrows A4–A7 oppose the direction of air travel of the tip vortex, to thereby prevent free-stream air flow around the wing tip. Consequently, the tip vortex is either attenuated or completely removed.

Figure 3:
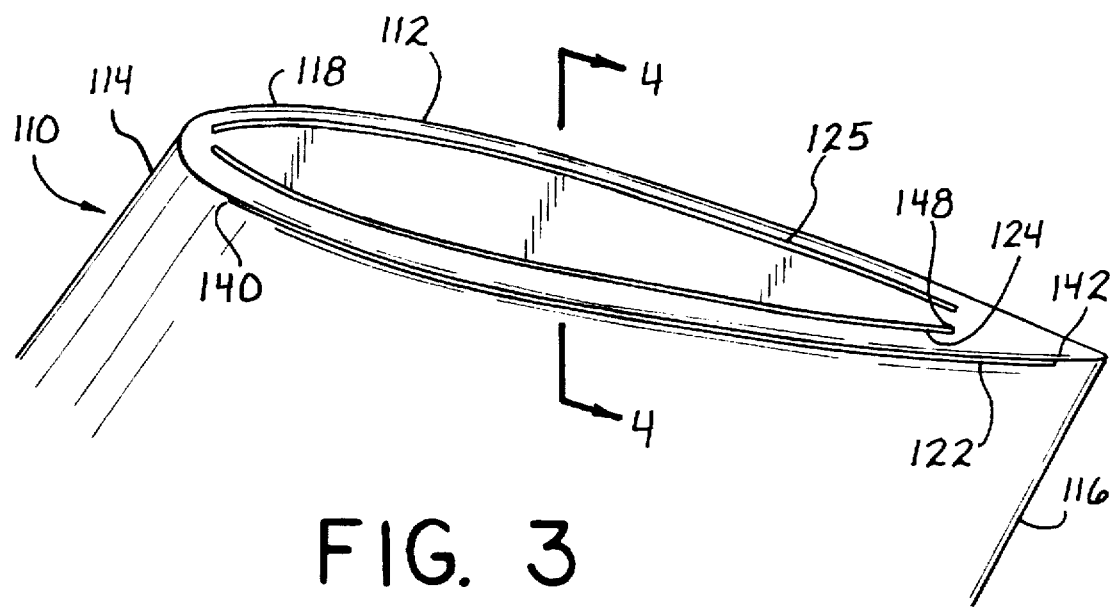
FIG. 3 is a perspective view of a tip vortex reduction system according to a second embodiment of the present invention.

Turning to FIG. 3, a tip vortex reduction system 110 for a rotorcraft blade 112 is illustrated. The rotorcraft blade 112 comprises a leading edge 114, a trailing edge 116, an outboard edge 118, and an inboard edge (not shown). The tip vortex reduction system 110 comprises a lower primary circulation-control slot 122 and a lower secondary circulation-control slot 124. The lower primary circulation-control slot 122 extends from a first location 140 near the leading edge 114 to a second location 142 near the trailing edge 116, and the lower secondary circulation-control slot 124 extends from the leading edge 114 to a location 148 near the trailing edge 116.

Since high pressure can occur on either the upper and lower surfaces of a rotorcraft blade tip, depending on the operating conditions, the tip vortex reduction system 110 of the second embodiment further comprises two upper circulation-control slots. As presently embodied, the tip vortex system 110 comprises an upper secondary circulation-control slot 125 and an upper primary circulation-control slot 160 (FIG. 4).

Figure 4:
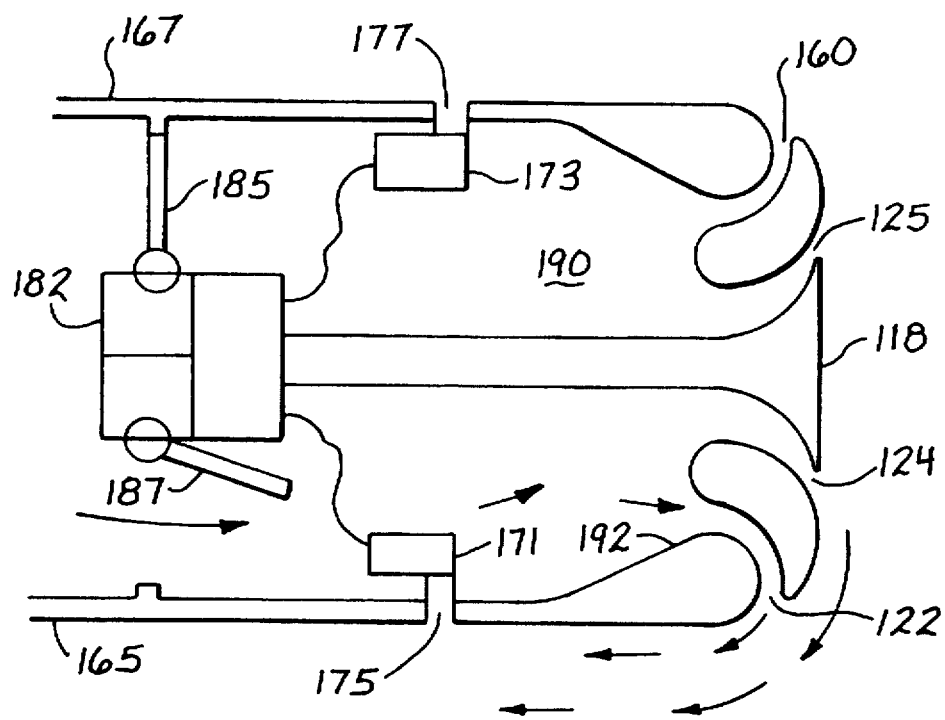
FIG. 4 is a cross-sectional view of the tip vortex reduction system of FIG. 3 taken along line 4—4.

A cross-sectional view of the tip vortex reduction system 110, taken along the line 4—4 of FIG. 3, is illustrated in FIG. 4. As shown in FIG. 4, the lower secondary circulation-control slot 124 and the upper secondary circulation-control slot 125 are disposed on the outboard edge 118, and the lower primary circulation-control slot 122 and the upper primary circulation-control slot 160 are disposed on the surfaces 165 and 167, respectively.

Since high pressure can occur on either surface 165 or 167, two pressure transducers 171 and 173 are provided for measuring the pressures of the two surfaces 165 and 167, respectively. The lower surface pressure transducer 171 detects the pressure on the lower surface 165 via a lower surface pressure tap 175, and the upper surface pressure transducer 173 detects the pressure on the upper surface 167 via an upper surface pressure tap 177. The outputs from the lower surface pressure transducer 171 and the upper surface pressure transducer 173 are fed into the control valve unit 182.

Two pivoting doors 185 and 187 are controlled between open and closed configurations by the control valve unit 182. As illustrated in FIG. 4, the upper pivoting door 185 is closed and the lower pivoting door 187 is open. The control valve unit 182 opens either of the two pivoting doors 185, 187 to allow passage of pressurized air into either the upper chamber 190 or the lower chamber 192, respectively. The control valve unit 182, for example, will direct pressurized air to the upper chamber 190 when the upper surface pressure transducer 173 detects a positive pressure on the upper surface 167, relative to the lower surface 165. Similarly, the control valve unit 182 will direct pressurized air through the pivoting door 187 to the lower chamber 192, when the lower surface pressure transducer 171 detects a positive pressure on the lower surface 165, relative to the pressure on the upper surface 167. In other words, the upper pivoting door 185 directs pressurized air to the upper chamber 190 when the rotor blade 118 is generating negative lift, and the lower pivoting door 187 directs pressurized air into the lower chamber 192 when the rotor blade 118 is generating positive lift. Otherwise, neither of the two pivoting doors 185, 187 input air into the two chambers 190, 192. Although in the presently preferred embodiment, each of the pivoting doors 185 and 187 is either fully open or fully shut, more sophisticated equipment may be employed for partially opening the pivoting doors according to the particular lift generated by the rotor blade 118 at any given time.

The tip vortex reduction system of the present invention can prevent blade tip vortex formation on rotorcraft, and can prevent wingtip vortex formation on winged aircraft. The tip vortex reduction system of the present invention can also be applied to air or marine propellers to prevent cavitation, for example, and can be used on the wing leading edge extension (LEX) to prevent LEX vortex formation. Implementation of the tip vortex reduction system of the present invention on rotorcraft blades provides a relatively quiet rotorcraft with less vibration, because the present invention minimizes the BVI phenomena. The tip vortex reduction system of the present invention is designed to prevent the vortex formation, whereas other prior art systems are designed to modify, augment, or expedite the disorganization and break up of the concentrated tip vortex.

Additionally, implementation of the tip vortex reduction system of the present invention provides an increase in lift of the blade or wing. The system further prevents the roll-up of air at the blade or wingtip, without adding end plates. This prevention of the roll-up of air is the equivalent of an effective enlargement of the wing aspect ratio. A high wing aspect ratio results in high lift and, thus, a more efficient aircraft.

The tip vortex reduction system of the present invention can also decrease induced drag of the blade or wing. Induced drag can be an unavoidable part of the finite three-dimensional conventional wing. According to prior art systems, induced drag can be minimized by designing wings with large area, large aspect ratio, or by installing end plates at the wing tips to reduce the three-dimensional tip losses. Although these prior art approaches have shown significant reduction in induced drag, the accompanying weight and/or span restrictions of typical aircraft may not allow the use of these types of wings on the aircraft, especially on helicopter rotor and fighter aircraft. The tip vortex reduction system of the present invention, however, has no such restrictions. Implementation of the tip vortex reduction system of the present invention on fixed-wing aircraft, for example, can improve both aircraft performance and the capacity of airports. Without wake vortex influence on the runway, aircraft and runway separation can be minimized. The tip vortex reduction system of the present invention has no moving mechanical parts, excluding the air supply system, and can therefore be easily installed and maintained. This system of the present invention differs from winglets or flaps, since no additional deflecting surfaces are involved.

Although exemplary embodiments of the invention have been shown and described, many other changes, modifications and substitutions, in addition to those set forth in the above paragraphs, may be made by one having ordinary skill in the art without necessarily departing from the spirit and scope of this invention.

What is claimed is:

1. An active control device for modifying a Tip vortex on a lifting body, the lifting body comprising a positive-pressure generating structure and a negative-pressure generating structure, and being adapted for providing lift when a first fluid pressure adjacent to the positive-pressure generating structure is greater than a second fluid pressure adjacent to the negative-pressure generating structure, the active control device comprising:
   an out-board edge disposed between the positive-pressure generating structure and the negative-pressure generating structure;
   a fluid source adapted for providing a positive pressure of fluid to an interior of the lifting body; and
   a fluid router disposed on the lifting body near the out-board edge and adapted for directing a portion of the positive pressure of fluid out of the interior of the lifting body and in a general direction from the fluid router toward the positive-pressure generating structure of the lifting body.

2. The active control device as recited in claim 1, the lifting body comprising a rotorcraft blade.

3. The active control device as recited in claim 1, the lifting body comprising an aircraft foil.

4. The active control device as recited in claim 1, the lifting body comprising a marine foil.

5. The active control device as recited in claim 1, the marine foil comprising one of a marine propeller and a marine lifting structure.

6. The active control device as recited in claim 1, further comprising an intermediate structure located between the positive-pressure generating structure and the negative-pressure generating structure, the fluid router being adapted for directing a portion of the positive pressure of fluid out of the interior of the lifting body and in a general direction from the intermediate structure toward the positive-pressure generating structure of the lifting body.

7. The active control device as recited in claim 6, the directing of fluid in the general direction from the intermediate structure toward the positive-pressure generating structure of the lifting body attenuating a flow of fluid from the positive-pressure generating structure over the intermediate structure and toward the negative-pressure generating structure.

8. A lifting body for providing lift to a craft, comprising:
   a positive-pressure generating structure;
   a negative-pressure generating structure;
   an interior volume between The positive-pressure generating structure and the negative-pressure generating structure, the interior volume being adapted for holding fluid;
   at least one aperture connecting an external structure of the lifting body to the interior volume; and
   a fluid router adapted for routing fluid from the interior volume of the lifting body to the external structure and in an in-board direction, the fluid being routed in a general direction from the negative-pressure generating structure to the positive-pressure generating structure of the lifting body.

9. The lifting body as recited in claim 8, the external structure comprising at least one of the positive-pressure generating structure, the negative-pressure generating structure, and an intermediate structure disposed between the positive-pressure generating structure and the negative-pressure generating structure.

10. The lifting body as recited in claim 8, the fluid router being adapted for routing fluid out of the interior volume of the lifting body and in a general direction from the intermediate structure toward the positive-pressure generating structure of the lifting body.

11. The lifting body as recited in claim 8, the positive-pressure generating structure and the negative-pressure generating structure meeting near a leading edge of the lifting body and near a trailing edge of the lifting body, the aperture comprising a primary slot extending generally from the leading edge of the lifting body to the trailing edge of the lifting body.

12. The lifting body as recited in claim 11, the positive-pressure generating structure comprising an outboard edge and an in-board edge, the primary slot being disposed near the positive-pressure generating structure approximately along the out-board edge.

13. The lifting body as recited in claim 12, the primary slot providing a fluid flow from the primary slot in a direction toward the in-board edge.

14. The lifting body as recited in claim 13, further comprising:
   an intermediate structure disposed between the positive-pressure generating structure and the negative-pressure generating structure; and
   a secondary slot disposed on the intermediate structure and adapted for providing a fluid flow from the secondary slot in a direction toward the primary slot.

15. The lifting body as recited in claim 14, the secondary slot extending on the intermediate structure generally from the leading edge of the lifting body to an intermediate area on the lifting body located between the leading edge and the trailing edge of the lifting body.

16. The lifting body as recited in claim 15, the primary slot being defined by a primary Coanda surface and a primary slot lip plate, and
   the secondary slot being defined by a secondary Coanda surface and a secondary slot lip plate.

17. The lifting body as recited in claim 16, the fluid comprising air, which is held within the interior volume under pressure.

18. A lifting body for providing lift to a craft, comprising:
   a positive-pressure generating structure;
   a negative-pressure generating structure;
   an out-board edge disposed between the positive-pressure generating structure and the negative-pressure generating structure; and a fluid router disposed on the lifting body near the out-board edge, the fluid router being adapted for routing fluid in a general direction from the negative-pressure generating structure to the positive-pressure generating structure.

19. A fluid routing system for routing fluid over an external surface of a lifting body, the fluid routing system being adapted for routing fluid in a general direction from a negative-pressure generating surface to a positive-pressure generating surface of the lifting body, to thereby attenuate a leakage of fluid from the positive-pressure generating surface to the negative-pressure generating surface, the fluid routing system comprising:

a determiner adapted for determining whether a positive pressure is present on the positive-pressure generating surface of the lifting body; and a fluid router adapted for routing fluid in a general direction from the negative-pressure generating surface to the positive-pressure generating surface and from an out-board edge of the lifting body to an in-board area of the lifting body, when the determiner determines that a positive pressure is present on the positive-pressure generating surface of the lifting body.

20. The fluid routing system as recited in claim 19, further comprising:

a fluid pressure source adapted for supplying pressurized fluid to the fluid router; and an activator adapted for activating the fluid pressure source when the determiner determines that a positive pressure is present on the positive-pressure generating surface of the lifting body.

21. A method of attenuating leakage of fluid from a positive-pressure generating surface of a lifting body to a negative-pressure generating surface of the lifting body, the method comprising the following steps:

determining whether a positive pressure is present on the positive-pressure generating surface of the lifting body; and routing fluid in a general direction from the negative-pressure generating surface to the positive-pressure generating surface at an out-board edge of the lifting body, upon a determination that a positive pressure is present on the positive-pressure generating surface of the lifting body.

22. An active control device for modifying a tip vortex on a lifting body, the lifting body comprising a positive-pressure generating structure and a negative-pressure generating structure, and being adapted for providing lift when a first fluid pressure adjacent to the positive-pressure generating structure is greater than a second fluid pressure adjacent to the negative-pressure generating structure, the active control device comprising:

a fluid source adapted for providing a positive pressure of fluid to an interior of the lifting body;

a fluid router disposed on the lifting body near the out-board edge and adapted for directing a portion of the positive pressure of fluid out of the interior of the lifting body and in a general direction from the fluid router toward the positive-pressure generating structure of the lifting body; and An intermediate structure located between the positive-pressure generating structure and the negative-pressure generating structure, the fluid router being adapted for directing a portion of the positive pressure of fluid out of the interior of the lifting body and in a general direction from the intermediate structure toward the positive-pressure generating structure of the lifting body.

23. The active control device as recited in claim 22, the directing of fluid in the general direction from the intermediate structure toward the positive-pressure generating structure of the lifting body attenuating a flow of fluid from the positive-pressure generating structure over the intermediate structure and toward the negative-pressure generating structure.

24. A lifting body for providing lift to a craft, comprising:

a positive-pressure generating structure;

a negative-pressure generating structure;

an interior volume between the positive-pressure generating structure and the negative-pressure generating structure, the interior volume being adapted for holding fluid;

at least one aperture connecting an external structure of the lifting body to the interior volume;

a fluid router adapted for routing fluid from the interior volume of the lifting body to the external structures the fluid being routed in a general direction from the negative-pressure generating structure to the positive-pressure generating structure of the lifting body;

an intermediate structure disposed between the positive-pressure generating structure and the negative-pressure generating structure; and a secondary slot disposed on the intermediate structure and adapted for providing a fluid flow from the secondary slot in a direction toward the primary slot, the primary slot being defined by a primary Coanda surface and a primary slot lip plate, and the secondary slot being defined by a secondary Coanda surface and a secondary slot lip plate. A negative-pressure generating structure, the positive-pressure generating structure and the negative-pressure generating structure meeting near a leading edge of the lifting body and near a trailing edge of the lifting body, the aperture comprising a primary slot extending generally from a leading edge of the lifting body to a trailing edge of the lifting body.

25. The lifting body as recited in claim 24, the fluid comprising air, which is held within the interior volume under pressure.

* * * * *